US010380235B2

(12) United States Patent
Bhatt

(10) Patent No.: US 10,380,235 B2
(45) Date of Patent: Aug. 13, 2019

(54) METHOD AND SYSTEM FOR ANNOTATION AND CONNECTION OF ELECTRONIC DOCUMENTS

(71) Applicant: BRANCHFIRE, INC., Chicago, IL (US)

(72) Inventor: Ravi K. Bhatt, Chicago, IL (US)

(73) Assignee: BRANCHFIRE, INC., Chicago, IL (US)

( * ) Notice: Subject to any disclaimer, the term of this patent is extended or adjusted under 35 U.S.C. 154(b) by 0 days.

(21) Appl. No.: 14/841,771

(22) Filed: Sep. 1, 2015

(65) Prior Publication Data

US 2017/0060829 A1 Mar. 2, 2017

(51) Int. Cl.

*G06F 17/00* (2019.01)
*G06F 17/24* (2006.01)
*G06F 17/22* (2006.01)

(52) U.S. Cl.

CPC ........ *G06F 17/241* (2013.01); *G06F 17/2235* (2013.01)

(58) Field of Classification Search

CPC ........................... G06F 17/2235; G06F 17/241
See application file for complete search history.

(56) References Cited

U.S. PATENT DOCUMENTS 7,559,034 B1 * 7/2009 Paperny .............. G06F 9/44526 345/629
7,779,347 B2 * 8/2010 Christiansen ......... G06F 17/241 715/230
7,958,444 B2 * 6/2011 Jacquin .............. G06F 17/2247 715/232

(Continued)

FOREIGN PATENT DOCUMENTS

| | | | |
|---|---|---|---|
| EP | 0965925 | A2 | 12/1999 |
| WO | WO-0056055 | A2 | 9/2000 |

OTHER PUBLICATIONS

International Search Report for PCT/US2016/049687 dated Dec. 8, 2016, 5 pp.

(Continued)

*Primary Examiner* — Cesar B Paula
*Assistant Examiner* — David Faber
(74) *Attorney, Agent, or Firm* — Marshall, Gerstein & Borun LLP

(57) ABSTRACT

A method and system for annotating and linking electronic documents is described herein. Separate annotation layers or connectors are used to store each annotation or connection associated with a document in order to improve the efficiency and robustness of collaborative annotation. When a user creates an annotation for a document, a new annotation layer is generated, containing information describing the annotation. The annotation layer is separate from the annotated document. The annotation layer may be transmitted to another user without transmission of the document, thereby reducing network traffic and avoiding metadata contamination within the document itself. This facilitates real-time collaborative annotation of electronic documents by multiple users. This also facilitates robust connections between documents or other data sources, which contain information regarding both the source and target documents.

14 Claims, 9 Drawing Sheets

(56) References Cited

U.S. PATENT DOCUMENTS 8,977,953 B1 * 3/2015 Pierre ................. G06F 17/2785
715/201
9,189,467 B1 * 11/2015 Patnoe .................. G06F 17/241
9,681,016 B2 * 6/2017 Arputharaj ............... H04N 1/04
9,880,989 B1 * 1/2018 Cadabam .............. G06F 17/241
9,990,059 B2 * 6/2018 Vong ................... G06F 3/03545
2004/0205542 A1 * 10/2004 Bargeron .............. G06F 17/241
715/201
2006/0015811 A1 * 1/2006 Tanaka .................. G06F 17/241
715/230
2006/0044619 A1 * 3/2006 Namiki ................. G06F 17/241
358/3.28
2007/0050712 A1 * 3/2007 Hull ...................... G06F 17/212
715/234
2010/0153835 A1 * 6/2010 Xiong ................. G06F 17/2247
715/230
2010/0278453 A1 * 11/2010 King ...................... G06Q 10/10
382/321
2011/0022942 A1 * 1/2011 Flemings .......... G06F 17/30899
715/230
2011/0289401 A1 * 11/2011 Fischer ................. G06F 17/211
715/232
2013/0013999 A1 * 1/2013 Kerry-Tyerman .... G06F 17/241
715/230
2013/0054636 A1 * 2/2013 Tang ....................... G06F 16/38
707/769
2014/0006922 A1 * 1/2014 Smith ................. G06F 17/2211
715/234
2014/0281875 A1 * 9/2014 Branton ................ G06F 17/241
715/230
2014/0281877 A1 * 9/2014 Burge ................... G06F 16/958
715/230
2015/0100569 A1 * 4/2015 Reis De Sousa ............................
G06F 16/24578
707/723
2015/0100872 A1 * 4/2015 Beezer .................. G06F 17/241
715/230
2015/0244892 A1 * 8/2015 Arputharaj ............... H04N 1/04
358/473
2015/0248387 A1 * 9/2015 Mattingly ............. G06F 17/241
715/230
2015/0339050 A1 * 11/2015 Vong ..................... H04L 65/403
345/173
2016/0321214 A1 * 11/2016 Hickey ................. G06F 3/0484

OTHER PUBLICATIONS

Written Opinion for PCT/US2016/049687 dated Dec. 8, 2016, 8 pp.
Written Opinion for PCT/US2016/049687 dated Sep. 5, 2017, 10 pages.

* cited by examiner

300

302 304 306 308 310 312

| DOC | A NAME | A LOCATION | A LAYER | AUTHOR | TIME | DATE | STATUS | REFERENCE |
|---|---|---|---|---|---|---|---|---|
| DO122 | A00132 | IAL/D0122 | A00132BFC | USER 1 | 08:32 | 2015-06-13 | ALL | |
| DO122 | IMPORTANT ARTICLE | IAL/D0122 | A00136BFC | USER 1 | 20:14 | 2015-03-18 | ALL | DOC273@p3,475, 128' |
| | | | | | | | | |
| | | | | | | | | |
| | | | | | | | | |
| | | | | | | | | |

METHOD AND SYSTEM FOR ANNOTATION AND CONNECTION OF ELECTRONIC DOCUMENTS

TECHNICAL FIELD

The present disclosure generally relates to an improved system and method for annotating and linking electronic documents.

BACKGROUND

Electronic documents of various sorts are ubiquitous in modern business. These documents include text-based documents produced using word processing software, presentations, graphical images, audio recordings, and video clips. It is frequently advantageous to mark-up or annotate such documents to indicate changes, ask questions, make comments, or note particularly important sections of the documents. Such annotation is frequently made by adding handwritten marks to a printed copy of a document. Text documents are also frequently annotated in word processing software, where the changes or comments are tracked within the text document itself. Such annotations within text documents are limited to structured text or the addition of certain types of graphical images. With the recent advent of touch-screens in devices such as tablet computers and smartphones, electronic annotation has significantly improved to allow free-form commenting by hand. Such annotation is greatly preferred by many users because it offers flexibility to annotate by, for example, circling sections, drawing arrows, or drawing schematic diagrams.

Some existing tools for annotation of electronic documents exist that allow users to add handwritten or other marks to some types of electronic documents. For example, the iAnnotate® software application by Branchfire, Inc., receives and stores user comments as part of certain page-based documents. The annotations become part of the annotated document, however, and cannot be sent to another user without sending the full document. Such approach is implemented in the widely used Portable Document Format (PDF) file format to store annotations within each PDF file, regardless of whether such PDF files are processed by Adobe Acrobat® or various other programs (e.g., Preview by Apple Inc.). This can lead to problems when multiple users simultaneously annotate copies of the same document, because neither annotated document will have the full set of annotations. All programs using the built-in annotation capabilities of PDF files inherently suffer from the problems associated with storing the annotations as part of the file, as do other built-in annotations (such as the annotation functions in Microsoft Word®). Attempts to allow simultaneous annotation have focused on version management approaches that attempt to frequently synchronize the document versions of the users or attempt to merge multiple copies of the document. Each of these approaches significantly increases processor usage, data transmission between users (which requires greater network bandwidth), and complexity of the annotation software. Additionally, current approaches hinder the ability to convert documents between different formats without losing the annotations. The invention described herein is addressed to improving software tools for annotation of electronic documents.

SUMMARY

The methods, systems, and media described herein relate to annotations and connections of electronic documents.

Such annotations or connections may be achieved by using annotation layers or connectors that are separate from the electronic documents that are annotated or connected. Thus, the annotation layers or connectors may be shared between users of different computing devices without repeatedly transmitting the electronic document. Additionally, multiple users may simultaneously annotate or connect documents because the annotations or connections do not change the electronic document.

According to an aspect of the invention discussed herein, a computer system may create and present annotations to an electronic document by: receiving an electronic document; presenting the electronic document to a user of a user computing device; receiving an indication of an annotation of a portion of the electronic document from the user; generating an annotation layer including information describing the annotation; applying the annotation layer to the electronic document such that the annotation overlays the portion of the electronic document; and/or presenting the electronic document and the overlaid annotation layer to the user. The annotation layer may be separate from the electronic document. Additionally, the annotation layer may be independent of the format of the electronic document and may be stored as part or all of a separate file from the electronic document. Metadata regarding the annotation layer may be included in or with the annotation layer.

In some embodiments, the computer system may further communicate the annotation layer to a second user computing device to be presented to a second user. The annotation layer may be communicated in response to receiving a selection of an option to transmit the annotation layer to the second user. Communicating the annotation layer to the second user computing device may include communicating the annotation layer to a server communicatively connected via the network to the user device and to the second user device, which server may communicate the annotation to the second user computing device. In further embodiments, the server may communicate the annotation to the second user computing device based upon the metadata of the annotation layer.

In further embodiments, the annotation may include a reference to a portion of a second electronic document. The reference to the portion of the second electronic document may also include an annotation of the second electronic document to be overlaid over the portion of the second electronic document. In such embodiments, applying the annotation layer to the electronic document may include generating a link to the referenced portion of the second electronic document. Such link may include instructions that cause the portion of the second electronic document to be presented when the link is selected by the user.

According to another aspect of the invention discussed herein, a computer system may receive and communicate annotations of an electronic document by: receiving an electronic document; receiving an indication of a plurality of user computing devices communicatively connected to the one or more servers via a network, each of the plurality of user computing devices having a copy of the electronic document stored in a local memory; receiving an annotation layer generated at a first user computing device of the plurality of user computing devices via the network; determining a second user computing device of the plurality of user computing devices to receive the annotation layer; and/or transmitting the annotation layer to the second user computing device via the network. The computer system may comprise one or more servers communicatively connected to the network. The computer system may also store the received annotation layer in a program memory of the computer system.

The annotation layer may be associated with the electronic document and may include information describing the annotation of the electronic document by a first user of the first user computing device. Additionally, transmitting the annotation layer to the second user computing device may not include transmitting either the electronic document or a copy of the electronic document to the second user computing device. The annotation layer may be independent of the format of the electronic document and may be stored as part or all of a separate file from the electronic document. The annotation layer may further include metadata regarding the generation of the annotation layer. In such embodiments, determining the second user computing device to receive the annotation layer may be based at least in part upon the metadata.

In some embodiments, the annotation may include a reference to a second electronic document. In such embodiments, the computer system may further obtain a copy of the second electronic document, store the copy of the second electronic document in a program memory of the computer system, and transmit the copy of the second electronic document to the second user device.

According to yet another aspect of the invention discussed herein, a computer system may receive an electronic document; determine a coordinate space corresponding to the received electronic document that indicates the dimensions of the received electronic document; present the electronic document to a user of the computer system; receive an indication of an annotation of a portion of the electronic document from the user; generate an annotation layer including information describing the annotation; apply the annotation layer to the electronic document such that the annotation overlays the portion of the electronic document; and/or present the electronic document and the overlaid annotation layer to the user via a display of the computer system. The annotation layer may be separate from the electronic document and may have a coordinate space that corresponds to the coordinate space of the electronic document. The coordinate spaces of the electronic document and the annotation layer may include one of the following: a page-based coordinate space, a canvas-based coordinate space, or a time-based coordinate space. The annotation layer may further be independent of the format of the electronic document and may be stored as part or all of a separate file from the electronic document.

In some embodiments, the computer system may further receive a second annotation layer including a description of a second annotation of a second portion of the document from a user of another computer system, apply the received second annotation layer to the electronic document such that the second annotation overlays the second portion of the document, and present the electronic document overlaid by the annotation layer and by the second annotation layer to the user via the display of the computer system. The second annotation layer may not include the electronic document or a copy thereof.

In further embodiments, the annotation layer may be a member of a set comprising a plurality of annotation layers, each of which may include metadata corresponding to the annotation layer. In such embodiments, the computer system may receive an indication of metadata criteria corresponding to one or more members of the set of the plurality of annotation layers, and select one or more annotation layers meeting the received metadata criteria. The one or more selected annotation layers may then be presented to the user by overlaying the selected annotation layers over the electronic document. Any member of the set of the plurality of annotations layers having metadata not meeting the metadata criteria may not presented.

In yet further embodiments, the computer system may receive an indication of another annotation including a link to another document. In response to receiving such indication of another annotation, the computer system may generate another annotation layer including information describing the another annotation and including the link to the another document. The another annotation layer may have a coordinate space that corresponds to the coordinate space of the electronic document. The another annotation layer may be applied to the electronic document such that the another annotation overlays the portion of the electronic document, but all of the annotation layer, the another annotation layer, and the electronic document may remain separate. The electronic document, the overlaid annotation layer, and the another annotation layer may then be presented to the user via the display. When a user selection of a portion of the another annotation is received, at least a portion of the another document may be presented to the user via the display using the received link.

According to yet another aspect of the invention discussed herein, a computer system may implement an electronic document mark-up tool to: receive a first electronic document; receive from a user an indication of a connection between a portion of the first electronic document and a second electronic document; generate a connector indicating a connection between the portion of the first electronic document and the second electronic document; apply the connector to the first electronic document such that an indication of the connection overlays the portion of the first electronic document; present the first electronic document and the overlaid indication of the connection to the user via a display of the computer system; receive from the user a selection of the indication of the connection; and/or present the second electronic document to the user in response to receiving the selection of the indication of the connection. In some embodiments, the electronic document mark-up tool may further cause the computer system to: apply the connector to the first electronic document such that a reverse indication of the connection overlays at least a portion of the second electronic document; present the second electronic document and the overlaid reverse indication of the connection to the user via the display of the computer system; receive from the user a selection of the reverse indication of the connection; and present the portion of the first electronic document having the overlaid indication of the connection to the user in response to receiving the selection of the reverse indication of the connection.

The connector may remain separate from each of the first and second electronic documents. In further embodiments, the connector may include a reference identifying the second electronic document. The connector may also be or include one or more annotation layers associated with the first electronic document or the second electronic document. The connector may further include information regarding the coordinate space of the first electronic document, in which case applying the connector to the first electronic document may be based upon the information regarding the coordinate space of the first electronic document. The indication of the connection may include an indication of a target portion of the second electronic document, in which case the connector may indicate the target portion of the second electronic document. Moreover, the first electronic document and the second electronic document may be different types of documents, including any of the following document types: word processing documents, publication layout documents, unformatted text documents, web pages, image-based documents, slide presentations, or spreadsheets.

BRIEF DESCRIPTION OF THE DRAWINGS

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 3 illustrates a diagram of an exemplary data structure storing a plurality of annotation layers.

DETAILED DESCRIPTION

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '__________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by expressly reciting the word "means" and a function without the recital of any structure, it is not intended that the scope of any claim element be interpreted based on the application of 35 U.S.C. § 112(f).

Without limitation, as used herein, the term "document" includes text-based documents (including word processing document and publication layout documents), web pages, image-based documents, slide presentations, spreadsheets, video or audio segments, or other media storing information intended to be presented together. Without limitation, as used herein, the term "annotation" includes any marking or other addition to a document that is presented together with the document, rather than directly revising the document. Annotations may include highlighting, underlining, strikethrough, circling, adding text notes, adding figures, adding images, adding audio, or adding any other marking or note to a document.

Overview

Figure 1:
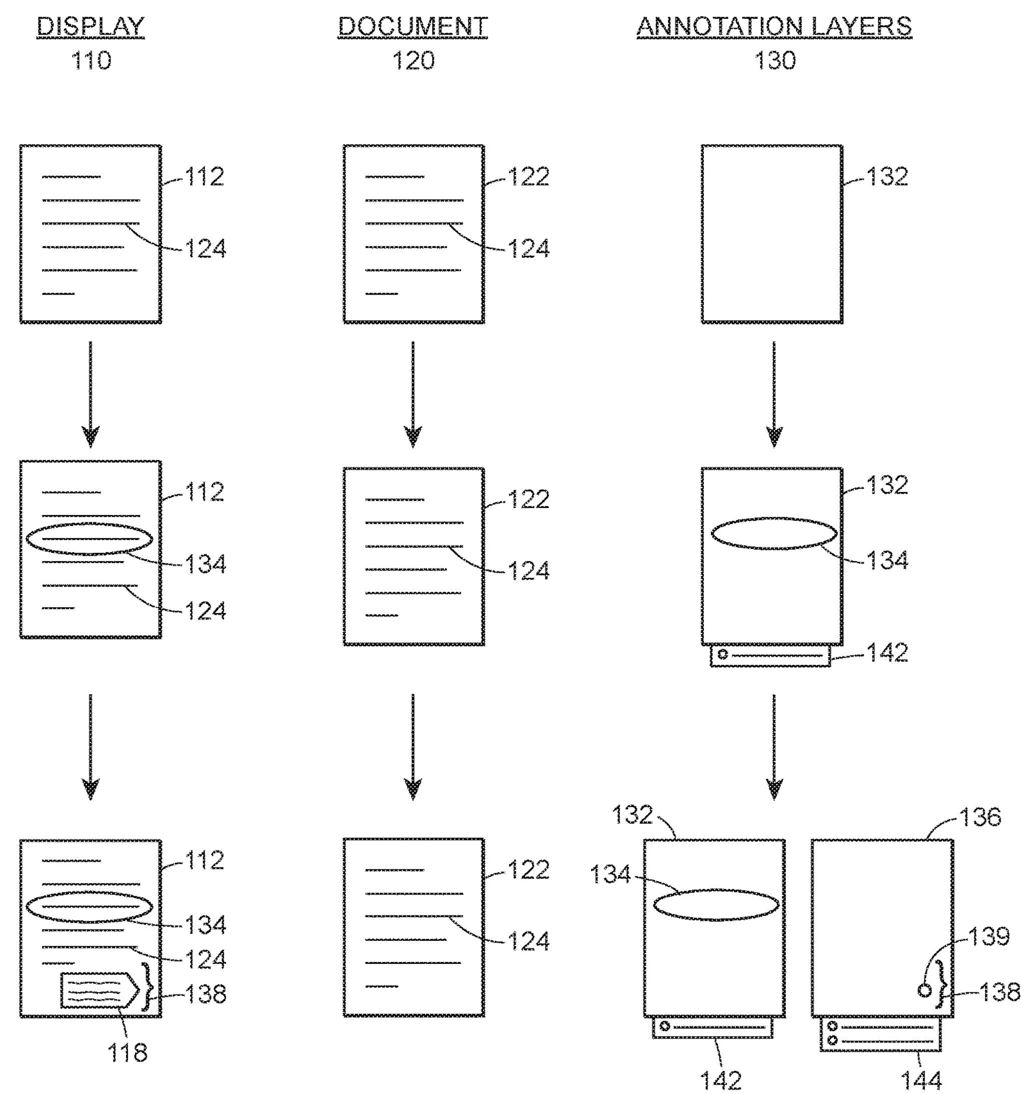
FIG. 1 illustrates an overview diagram of the operation of the annotation system.

FIG. 1 illustrates an overview diagram of the operation of the annotation system. The left column 110 (labeled "DISPLAY") illustrates a representation of display views, which may correspond to the presentation of documents, annotation, or other information to a user. The center column 120 (labeled "DOCUMENT") illustrates a representation of documents to be annotated. The right column 130 (labeled "ANNOTATION LAYERS") illustrates annotation layers associated with annotations.

The top row in each of columns 110, 120, and 130 is associated with a state of a document 122 before any annotations are received. The document 122 is illustrated as a text document for simplicity, but the annotation system may operate on any sort of document, including web pages, graphical images, sound files, video files, etc. Each document 122 will have a coordinate space associated with it, which coordinate space indicates the type and dimensions of the document. For example, a letter-size (i.e., 8.5"×11") word processing document may have a corresponding coordinate space that matches each page (e.g., an 8.5"×11" space). In some embodiments, each discrete portion (e.g., each page, each slide, each frame, etc.) of the document 122 may have a coordinate space associated with it. The document 122 is illustrated as having only one page for clarity, and the content 124 of the document 122 is represented by lines in the document.

The annotation layer 132 is illustrated in the right column 130 as initially not containing any information. The annotation layer 132 may be a transparent layer matching or corresponding to the coordinate space of the document 122 or some part thereof (e.g., a page of the document 122). Although an annotation layer 132 is illustrated as existing prior to any annotations, some embodiments may instead generate the annotation layer 132 in response to receiving an annotation from a user.

The left column shows a display view 112 of the initial document 122 without any annotations. This may be accomplished by overlaying or superimposing the annotation layer 132 over the document 122. Because the annotation layer 132 is transparent (aside from any annotations contained therein) and shares a coordinate space with the document 122, the annotation layer 132 may be overlaid on the document 1 to present any annotations contained therein to the user. As illustrated, the display view 112 is initially identical to the document 122 because no annotations have been created.

The second row illustrates the presentation of an annotation 134 received from a user of the system. The annotation 134 may be created by the same user to which annotated display view 114 is presented, or the annotation 134 may be created by another user. When the annotation 134 is created by any user, the system may generate a new annotation layer or edit an existing annotation layer 132. In either case, a representation of the annotation 134 may be added to the annotation layer 132 based upon the position of the annotation within the coordinate space. In some embodiments, the annotation layer 132 may include additional metadata 142 that indicates information regarding the annotation (e.g., date and time, user who created the annotation, location of user when annotation was created, version of the document 122 that was annotated, etc.). The metadata 142 may be stored in a file containing the annotation layer 132 in a separate portion not configured for display. Thus, the annotation layer 132 may store data configured to be processed into a graphical layer including a representation of the annotation 134 and data configured to be processed into a text portion containing the metadata 142. Among other uses, such metadata 142 may be used to sort or filter a plurality of annotation layers, as discussed below.

When the annotation 134 is created by another user, the other user may share the annotation 134 by sending the annotation layer 132 containing the annotation 134. Unlike existing annotation methods, the annotation layer 132 remains separate from the document 122. Therefore, the annotation 134 may be sent between users having access to the annotated document 122 by sending only the annotation layer 132. As illustrated, the annotation 134 is stored only in the annotation layer 132, and the document 122 does not change. Because the annotations are stored in the separate annotation layers and do not change the annotated document, this has an additional advantage of maintaining "clean" documents that can be transmitted to external parties without concern regarding inadvertent disclosure of annotations or annotation metadata. To present the annotation 134 to the user, the annotation system may apply the annotation layer 132 to the document 122 by overlaying the transparent annotation layer 132 over the document 122. The resulting annotated display view 114 includes the annotation 134 over the content 124 of the document 122. The user views the annotation 134 as if the document 122 itself had been annotated, but the annotation 134 remains within the annotation layer 132.

The third row in FIG. 1 illustrates the effect of adding a second annotation 138 using a second annotation layer 136. Again, the document 122 remains unchanged by the annotations, as shown in the middle column 120. The second annotation 138 is added by generating the second annotation layer 136, which may include metadata 144. The annotation layer 132 remains unaltered, as shown in the right column 130. Like the annotation layer 132 and all annotation layers associated with the document 122, the second annotation layer 136 has a coordinate space that matches or corresponds to the coordinate space of the document 122. The annotations 134 and 138 may be presented in the annotated display view 116 by overlaying both the annotation layer 132 and the second annotation layer 136 over the document 122, while maintaining each of the document 122, the annotation layer 132, and the second annotation layer 136 as separate objects.

In some embodiments, the annotations may include links to additional information or external resources, such as other documents or portions of other document. The second annotation 138 is shown in the exemplary overview of FIG. 1 as including a reference 139 to such additional information. For example, the reference 139 may indicate a target document (not shown) or a portion thereof. As another example, the reference 139 may indicate another location within the document 122, such as a location associated with the first annotation 134. The additional information or link to an external resource may be stored with the metadata 144 or otherwise with the second annotation layer 136. The reference 139 may be stored as a visible or transparent marker or anchor within the second annotation layer 136, which may be coincident with the annotation 138. Alternatively, the reference 139 may be stored in a third annotation layer (not shown) that annotates the second annotation layer 136. Such third annotation layer may thus take the second annotation layer 136 as its source document for annotations such as reference 139 or other linking or non-linking annotations of the sorts described herein. Such embodiments may be only indirectly linked to the document 122 through other annotation layers or may not be intended to link to the source document 122. In some embodiments, the reference 139 may be represented by a reference indicator 118 displayed to the user in the annotated display view 116. The reference indicator 118 may be displayed, for example, as a pop-up box within the annotated display view 116, which may be opened or closed by the user by selecting or scrolling over the location of the marker or anchor. In some embodiments, the user may select the reference indicator (or a portion thereof) to obtain or view the external resource (not shown).

From this overview illustrated in FIG. 1, it should be understood that any number of annotation layers may be generated for a document without changing the document itself. The annotations layers match or correspond to the coordinate space of the document with which they are associated. Each annotation layer, or a subset thereof, may be applied to the document by overlaying the annotation layers over the document, like panes of glass, to build up the annotated document presented to the user. Because the document remains separate from the annotation layers, multiple users may share annotations to a document by transmitting or receiving each separate annotation layer. For example, if each user already has access to a copy of the document, an annotation by one user may be shared with another user by sending only the annotation layer associated with the annotation. This significantly reduces data transmission, allowing effectively real-time or synchronous joint annotation by multiple users. Moreover, the annotations and metadata associated with the annotations are inherently kept separate from the document itself, eliminating the need to remove annotation-related metadata from the document using specialized software in certain information-sensitive communications (e.g., negotiated contracts, press releases, legal briefs, etc.).

Additionally, the annotation layers are described herein as "layers" only to aid understanding and are not limited to layers of fixed or variable dimensions. Instead, any type of data object or entry may be used to store data regarding annotations and/or connections within or between documents. It should be understood that the annotation layers described herein may be implemented as connector objects or items that are separate from the document 122. Such connectors may be stored as separate files that indicate a location or position within a source document 122 and an annotation of the source document. As described below, such connectors may further include an indication of a location or position within a target document. Thereby, the annotation layers or connectors may create a link between documents, such as by the reference 139. Some annotation layers or connectors may further annotate other annotation layers or connectors, thereby annotating or directly linking to annotation layers or connectors. In some embodiments, the annotation layers may not have inherent document spaces, in which case information regarding the documents spaces of source or target documents may be included within the connector or may be determined when the connector is applied to the source document 122. In embodiments in which the annotation layers are connectors between documents (or between locations within a document), such annotation layers or connectors may be used to connect or link documents of different types, as discussed elsewhere herein.

Figure 2:
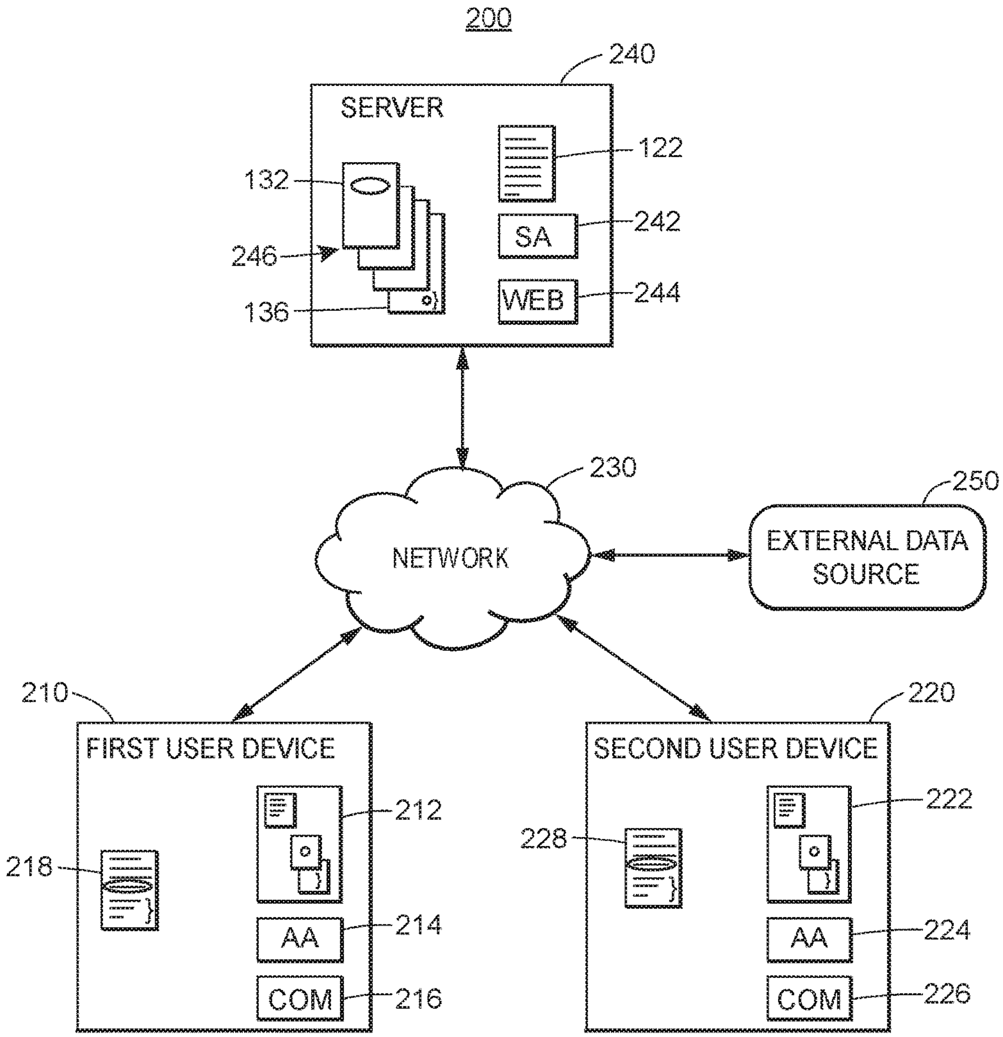
FIG. 2 illustrates a block diagram of an exemplary annotation system that may be used to implement methods of annotating documents.

FIG. 2 illustrates a block diagram of an exemplary annotation system 200 that may be used to implement methods of annotating documents, as described elsewhere herein. The annotation system 200 may include a first user device 210, a second user device 220, and a server 240, all connected by a network 230. Additional user devices or servers (not shown) may be included in some embodiments. The network 230 may further connect to one or more external data sources 250 that may be linked to annotations by references such as reference 139. Each of the user devices 210 and 220 may be computing devices, such as workstations, desktop computers, notebook computers, tablet computers, smartphones, wearable computers, or other computers capable of storing data and executing instructions. The server 240 may be one of a plurality of interconnected servers configured to store or transfer data via the network 230. In some embodiments, the server 240 may serve as the primary repository of data regarding the document 122 and associated annotation layers 132 and 136, which may be accessed by the user devices 210 and 220 in a cloud computing or thin-client system. The network 230 may be any public or private communication network capable of transmitting computer-readable data, including local area networks, wide area networks, or the Internet.

The first user device 210 may store local copies of the document 122 and the annotation layers 132 and 136 in a memory 212, which may also store one or more additional documents or annotation layers. For example, the memory 212 may store local copies of external resources, such as linked documents indicated by references in the annotation layers. In some embodiments, the memory 212 may store additional document not associated with the document 122 or any annotation layers, which documents may be later linked or annotated by the user. The memory 212 may likewise store programs or applications. The first user device 210 may execute an annotation application 214 (instructions defining which may be stored in the memory 212) to perform some or all of the aspects of the annotation methods described elsewhere herein. The annotation application 214 may control one or more processors of the first user device 210 to generate and display a local annotated document 218 to the user by receiving, selecting, and applying the annotation layers (such as annotation layers 132 and 136) to the document (such as document 122). The local annotated document 218 may be generated and stored in a memory cache or may exist only when the document and annotation layers are combined by a GPU to produce an output signal to be presented via a display (not shown) of the first user device 210. The annotation application 214 may further be configured to receive new annotations from the user via an input (not shown) and generate annotation layers associated with the received annotation. The document or annotation layers may be sent and received via the network 230 using a communication module 216, which may include software and hardware components.

The second user device 220 may likewise include local copies of the document 122 and the annotation layers 132 and 136 in a memory 222, which may also store one or more additional documents or annotation layers, as well as other application or programs. An annotation application 224 may execute on one or more processors of the second user device 220 to implement any of the document annotation methods described herein to generate and display a local annotated document 228 to the user of the second user device 220. A communication module 226 may likewise establish and manage communications between the second user device 220 and the first user device 210 or the server 240 via the network 230. Through such communications, the local annotated documents 218 and 228 may be periodically, continuously, or occasionally synchronized to include annotations made by users of both user devices 210 and 220. Such synchronization may be facilitated by the server 240, which may receive, store, and send copies of annotation layers from a plurality of users and user devices.

The server 240 may, in some embodiments, store copies of the document 122 and annotation layers 132 and 136 in a memory or data storage device. The one or more processors of the server 240 may execute a server application 242 that manages the files and connections with user devices. The server application 242 may further maintain information relating to user accounts and permissions of users or user devices to access, edit, replace, or delete documents 122 or annotation layers 246. For example, annotation layers 246 may be associated with permission levels for certain authorized users, such that only specifically authorized users may view the annotations. Similarly, each document stored on the server 240 may be associated with a list of authorized users or user devices, which list may further specify permission levels (e.g., read-only, create annotations, or full read-write access). In some embodiments, the server 240 may also execute a web server application 244 that allows access to files such as the document 122 and the layers 246 through a web browser. Regardless of the method of accessing the files, the user devices 210 and 220 may access documents 122 and annotation layers 246 stored on the server 240 via the network using any known communication protocol to receive new annotation layers or updated versions of documents.

The server 240 may also receive new or revised annotation layers or documents via the network 230, which may then be stored on the server 240 or in a memory device communicatively connected to the server 240. When a new or revised annotation layer is received from a user device, the server 240 may automatically transmit the annotation layer to all other communicatively connected user devices. Additionally, or alternatively, each user device may periodically query the server 240 to determine whether any new or revised annotation layers 246 are available and to receive the new or revised annotation layers 246. For example, upon generation of a new annotation layer from a user annotation, the first user device 210 may transmit the new annotation layer via the network 230 to the server 240. The server 240 may then store the new annotation layer and transmit the new annotation layer to the second user device 220 via the network, or the second user device 220 may transmit a request for any new annotation layers to the server 240. As an example of such polling method of requesting new annotation layers from the server 240, the second user device 220 may transmit a message to the server 240 periodically (e.g., every second) that includes a list of all annotation layers associated with the document 122 stored locally in the memory 222 of the second user device 220. Upon receiving such request from the second user device 220, the server 240 may determine whether any additional annotation layers associated with the document 122 are stored in the memory of the server 240. If any new annotation layers are found (that the user of the second user device 220 has permission to access), the server 240 may then transmit the new annotation layers to the second user device 220. Because the file size of each annotation layer in the set of annotation layers 246 is significantly smaller than the document 122 and set of all annotation layers 246, the amount of data transmitted through the network 230 for each annotation is greatly reduced. Thus, each annotation may be separately transmitted in a separate annotation layer, thereby facilitating approximately real-time transmission of annotations between the first and second user devices 210 and 220.

Although the annotation layers are discussed herein as distinct and separate files, the annotation layers may similarly be stored as separate entries in a memory or database in some embodiments. Such combined storage of a plurality of annotation layers in some embodiments may nonetheless involve maintaining each annotation layer separately within the memory or database, as well as separately communicating individual annotation layers via the network 230. When transmitting annotation layers via the network 230, the server 240 or user device 210 or 220 may extract the information regarding the individual annotation layer from the memory or database and package the individual annotation layer in an object to be transmitted via the network 230. Upon receipt of such transmitted object, information regarding the individual annotation layer may be extracted from the transmitted object and added to the memory or database. An individual annotation layer may thus be communicated and stored in such manner as to remain separate from the document and other annotation layers, even though the annotation layers may be stored together (e.g., as rows in a table within a database or as separate tables within a database). Moreover, annotation layers stored together in a database may reference separate files for part of each annotation layer (e.g., graphical files storing hand-drawn annotations received from a user).

FIG. 3 illustrates a diagram of an exemplary data structure 300 storing a plurality of annotation layers. Although the annotation layers may be any of the annotation layers 246, the annotation layers 132 or 136 are respectively illustrated as rows 321 and 322. The exemplary data structure 300 is illustrated as a table 302, including a document identifier column 304, several annotation layer identifier columns 306, and several metadata columns 308. Entries are shown in each column for rows 321 and 322, but additional rows corresponding to further annotation layers (not shown) may be included. The structure of the data structure 300 is exemplary only, and many other alternative data structures containing the same or similar information may be used. For example, fewer, additional, or alternative columns may be included in some embodiments. Alternatively, information similar to that included in the illustrated columns may instead be included as formatted text entries in separate files for each annotation layer. Moreover, the entries used are exemplary only, and any type, format, or manner of entries may be used in various embodiments.

For each row in the table 302, the document identifier column 304 (labeled "DOC") indicates the document corresponding to the annotation layer stored in that row. Thus, the rows 321 and 322 (corresponding to the annotation layers 132 and 136) both contain entries in the document identifier column 304 identifying document 122 (identified as "D0122"). Other annotation layers associated with other documents would contain other entries identifying other documents.

Similarly, the annotation layer identifier columns 306 contain entries identifying the annotation layer for each row. These columns may include a column (labeled "AName") storing a name for the annotation layer (such as a default name or a name entered by a user), a column (labeled "ALocation") storing an annotation location indicating the location within a file director structure of files associated with the annotation layer, and an annotation column 310 (labeled "ALayer") storing information regarding the annotation or annotations of the annotation layer. For example, the annotation column 310 may include a reference to a file containing the annotation associated with each annotation layer. As illustrated, the annotation column 310 includes a reference to file "A00132.BFC" associated with annotation layer 132 in row 321 and a reference to file "A00136.BFC" associated with annotation layer 136 in row 322. The files "A00132.BFC" and "A00136.BFC" may be include computer-readable instructions corresponding to graphical representations of the annotations 134 and 138 for each respective annotation layer 132 and 136, both of which may be stored in directory "/AL/D0122" associated with the document 122. Additionally, or alternatively, the annotation column 310 may include an entry including containing the information needed to apply the annotation to the document (e.g., location coordinates, size, and content of the annotation). Thus, a text annotation may be stored as coordinates indicating the beginning position within the document 122 and a text string to be displayed, or a line may be represented by origin and terminal coordinates within the document 122. As noted above, the annotation column 310 may be implemented as multiple columns in some embodiments.

The metadata columns 308 may contain metadata regarding each annotation layer. This may include information regarding the author, time, date and status of the annotation layer. For example, row 321 illustrates that annotation layer 132 was authored by user 1 at 8:32 on Jun. 12, 2015. The status metadata may indicate whether the permissions associated with each annotation, such as whether access or editing rights are restricted to a subset of users or whether all users of the system are permitted to access and edit the annotation layer. Additionally, in some embodiments, the status metadata may indicate whether an annotation layer is current, archived, restricted, or marked for deletion. The illustrated metadata columns also include a reference column 312 indicating a reference 139 to another document or external data source. The external data source may be any source of information not contained within the document 122. For example, row 322 illustrates a reference 139 to a location with another document as an entry "DOC273@p3.475.128," which may indicate a position on page 3 of a target document identified with the number "273" in the document identifier column 304. To indicate the location within the document, the reference 139 may further indicate a document space associated with the target document. In some embodiments, the reference 139 may include an indication of a particular location within the document 122, such as another page than the page on which the reference 139 is anchored or positioned. Additionally, or alternatively, the reference column 312 may include links or connectors that include information regarding the connection between documents, as described below.

Document Connectors

The annotation layers may also be used in conjunction with connections between documents, such as the reference 139 discussed above. By decoupling the annotations from the document to be annotated, the annotation layers may be further used to make connections between documents of the same or different types. Such annotation layers as connectors remain separate from each document, so they likewise achieve the same advantages of improved portability and reduced network resource utilization (due to their smaller size), as discussed elsewhere herein. Additionally, using annotation layers as connectors between documents further allows the creation of format-independent and information-rich connections with or between documents. For example, by adding annotation information regarding the referenced target document, the annotation layer may provide a context or explanatory annotation to the connection. Moreover, the annotation layer may serve as a bidirectional link between the two documents, such that each document links to a particular portion of the other document using the same annotation layer. This creates a robust connection because changing the annotation on one document automatically updates the connection from the other document. Although such connections are described below as being between separate documents for the sake of clarity, such connections may also be made between sections of the same document. Similarly, such connections may be made between a document and an annotation layer, between an annotation layer and a document, or between annotations layers.

Figure 4A:
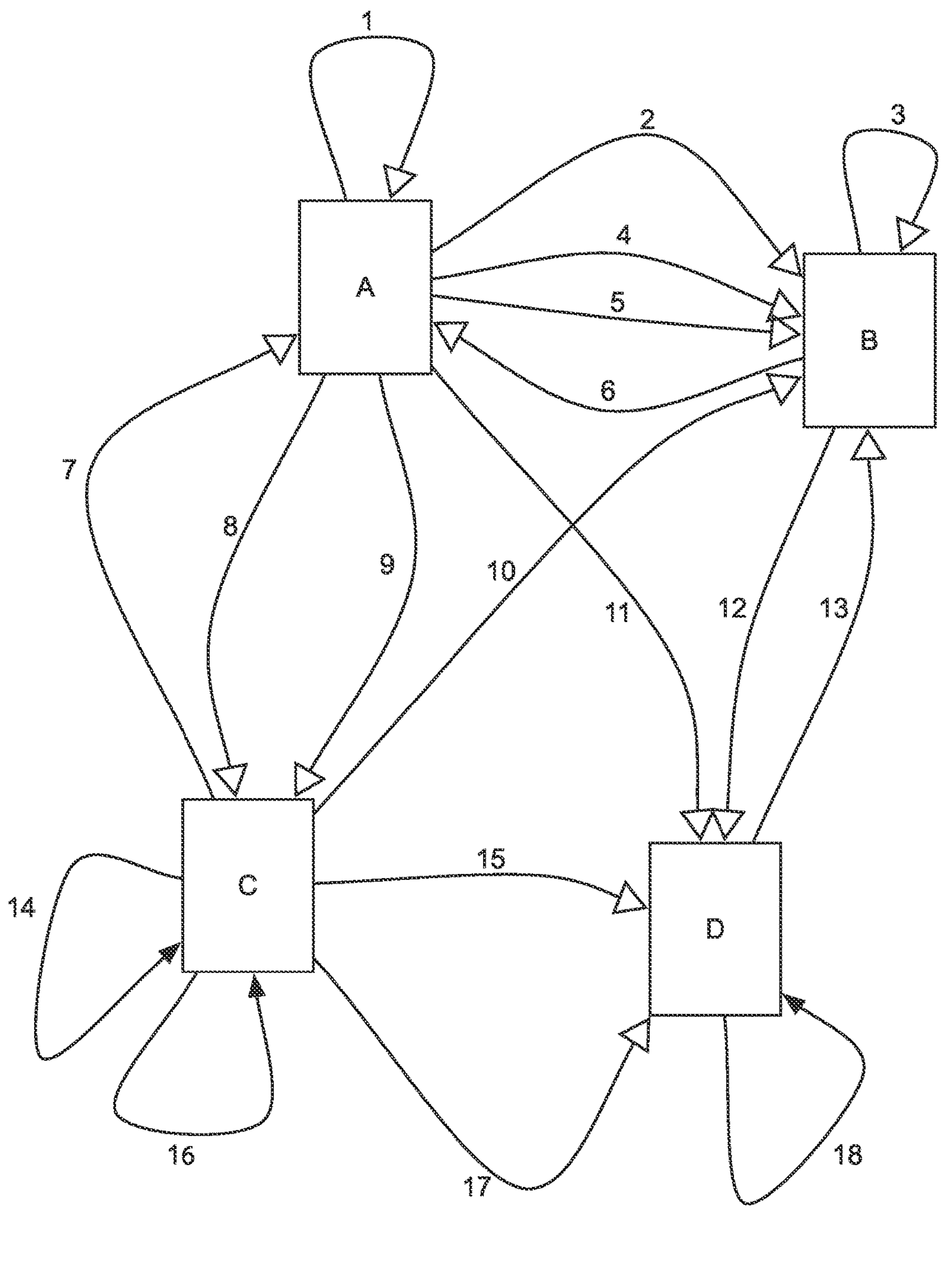
FIGS. 4A-B illustrate block diagrams of connections between and within documents using connectors and annotation layers.
Figure 4B:
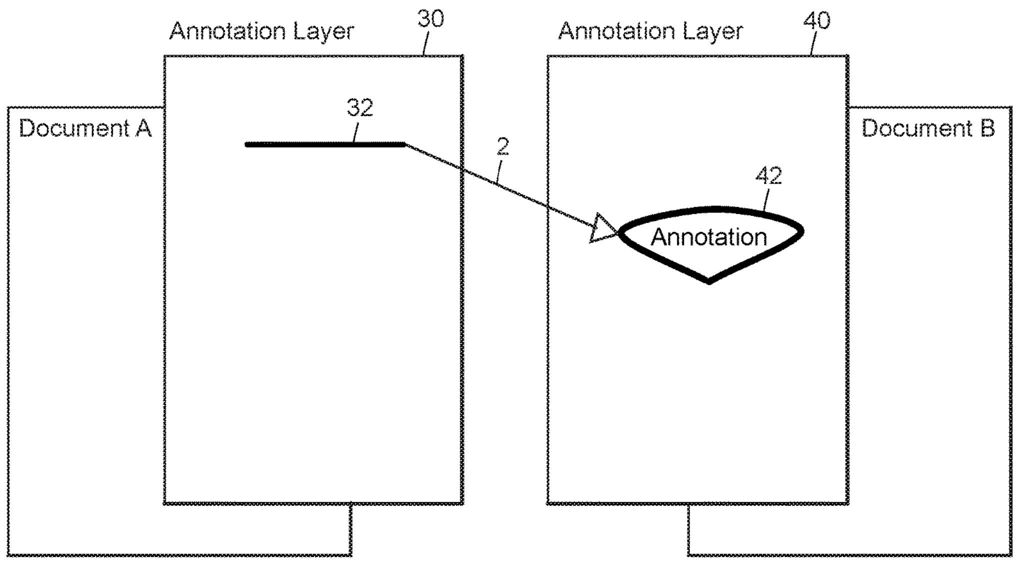

FIGS. 4A-B address the use of annotation layers as connectors within and between documents. FIG. 4A illustrates a block diagram of connections between a plurality of documents A-D, which may be of the same type or of different types. For example, document A may be a page-based word processing document, while documents B and C may be canvas-based spreadsheet or web page and document D may be a time-based video. Each of the connectors 1-18 indicates a connection between a location within a document A, B, C, or D and another location within the same or another document A, B, C, or D. Each of the connectors 1-18 is illustrated as an arrow originating at a source document to a target document to show the direction of the connection. For example, connector 2 is shown as an arrow extending from document A (the source document) to document B (the target document) to indicate a connection wherein target document B is referenced in an annotation layer associated with source document A. The source document and target document may be the same document A, B, C, or D for some connectors. For example, connector 1 indicates a connection between a first location within document A and a second location within document A by an arrow looping from document A as the source document back to document A as the target document. The connectors 1, 3, 14, 16, and 18 each contain references in which the source document and the target document are the same document, while connectors 2, 4, 5, 6, 7, 8, 9, 10, 11, 12, 13, 15, and 17 each contain references in which the target document is a separate document from the source document.

The connectors 1-18 may connect portions of the documents A-D in various manners using annotation layers. For example, an annotation layer associated with the source document may include a reference directly to a portion of the target document. The connector 1 may be an annotation layer of document A or a reference within an annotation layer of document A (such as reference 139 within annotation layer 136) that indicates a portion of document A as the target (e.g., a page, paragraph, or figure within document A). Thus, the connector 1 may be a part of an annotation layer of document A that simply references a location within document A. In such embodiments, a separate annotation layer may be created in document A to provide additional information regarding the portion of document A that was referenced by connector 1. In such embodiments, the separate annotation layer may be displayed whenever the associated portion of document A is presented to the user (according to user preferences).

Alternatively, the connector 1 may include a reference in a first annotation layer of document A (such as reference 139 in annotation layer 136 of document 122) specifying a second annotation layer as the target document (such as annotation layer 132). In such embodiments, the connector may reference or link to the second annotation layer associated with a portion of the same or another document. For example, the connector 1 may be a reference in the first annotation layer of document A identifying the second annotation layer of document A. When the first annotation layer is applied to document A, a link (such as reference indicator 118) may be presented based upon connector 1. If the user selects the link, the second annotation layer may be applied to the corresponding portion of document A. If the second annotation layer includes mark-up or other annotations (such as the annotation 134 of annotation layer 132), such annotations may be presented to the user as the second annotation layer overlaid on the document A.

As yet another alternative, the connector 1 may be separate from the one or more annotation layers associated with document A. Instead, the connector 1 may indicate the source document and the target document, which may include indications of locations within each of the source and target documents. As above, either or both of the source and target documents of connector 1 may be either the document A itself or an annotation layer associated with document A. For example, the connector 1 may include an indication of a location within document A as the portion of the document A as the source document to be linked to an annotation layer of document A, and the connector 1 may further include an indication of the annotation layer as the target document. As another example, the connector 1 may include an indication of a first annotation layer of document A as the source document and an indication of a second annotation layer of document A as the target document. Thus, the connector 1 may be separate from the annotation layers and the documents. For example, the connectors 1-18 may be separate files indicating annotation layers or documents, or the connectors 1-18 may be separate entries in a database (such as a table of connectors that references one or more additional tables of annotation layers). For example, the connector 1 may include an indication of annotation layer 136 as the source document and an indication of annotation layer 132 as the target document. Such connector 1 may or may not include an indication of the document 122 (document A) associated with each of the annotation layers 132 and 136, as the annotation layers 132 and 136 may each include indications of the portions of document 122 with which they are associated.

As a still further alternative, one or more of the connectors 1-18 may include both an annotation layer associated with the source document and an annotation layer associated with the target document. In such embodiments, the connector 1 may include not only indications of the annotation layers associated with the document A but may include the annotation layers within the connection. For example, the connection may be created by generating a first annotation layer associated with the source document (including a reference or link within the annotation layer) and generating a second annotation layer associated with the target document. Alternatively, the connection may be created by including information regarding the connection (e.g., the reference 139) and information regarding the source and target documents within a file. The connector may thus include both the first and second annotation layers with the connector or may include alternative information regarding the annotations within both documents from which annotation layers could be generated, if desired. The second annotation layer may initially be generated without any annotations or references, such as illustrated in FIG. 1 by the annotation layer 132 in the first row, prior to receiving the annotation 134. Annotations may, of course, be added to either the first or second annotation layers.

FIG. 4B illustrates a block diagram of a connector 2 linking a source document A to a target document B by annotation layers 30 and 40, respectively associated with the documents A and B. The first annotation layer 30 is associated with the document A and contains at least a reference 32 indicating a portion of the annotation layer 30 that is linked to the target document B. The reference 32 of the first annotation layer 30 is linked to the second annotation layer 40 associated with document B by the connector 2. The connector 2 may link the first annotation layer 30 to the second annotation layer 40 in any of the manners discussed herein. In some embodiments, the connector 2 may link the reference 32 of the first annotation layer 30 to an annotation 42 of the second annotation layer 40.

To share annotations or connections of the documents A and B as discussed elsewhere herein, the connector 2 may be communicated between user devices 210 and 220 via the network 230. For example, a connector 2 created at the first user device 210 may be transmitted via the network 230 to the server 240 and from the server 240 to the second user device 220. Communicating the connector 2 may include transmitting only the connector 2 in some embodiments in which the necessary annotation layers 30 and 40 are already available at the second user device 220. In other embodiments, one or more of the annotation layers 30 and 40 may be transmitted together with the connector 2, either as part of the connector 2 or as separate annotation layers. In further embodiments, one or more of the documents A and B may be communicated only when necessary, viz. when at least one of the documents A or B is not available at the second user device 220. In some embodiments, the source document A or the target document B may be identified by reference to an external location, or a copy of the source document A or the target document B may be transmitted to the server 240, where it may be stored. A copy of the source document A or the target document B may then be transmitted from the server 240 to the second user device 220 upon request.

As discussed elsewhere herein with respect to annotation layers, the connectors 1-18 may connect documents regardless of the coordinate spaces or formats of the documents. For example, the document A may be a word process document having a page-based coordinate space, and the document B may be another type of page-based document (e.g., a slide presentation or publication layout format, such as the Portable Document Format) or another type of document (e.g., a spreadsheet or web page). Because the connectors and/or annotation layers exist separately from the documents A and B, the connector 2 may be used to connect and annotate the documents A and B, even where the documents A and B are of different types, coordinate spaces, or formats. Moreover, by including coordinate space information in the connector 2 or the annotation layers 30 and 40, the connection may be made directly between portions of the documents A and B. As yet a further advantage, the connector 2 permits reverse linking from the target document B to the source document A. As previously noted, the connector 2 is not embedded within the source document A, instead the connector 2 indicates both document A and B (or the annotation layers 30 and 40 associated with documents A and B). By remaining separate from the documents A and B, the connector allows bi-directional connection between the documents, such that a user may select the annotation 42 associated with document B in order to find the portion of document A that references document B through connector 2. This operates in contrast to known linking techniques (e.g., HTML or XML links), which provide only unidirectional connections from a source document to a target document because they are embedded within the source document.

Annotation Layers

Figure 5:
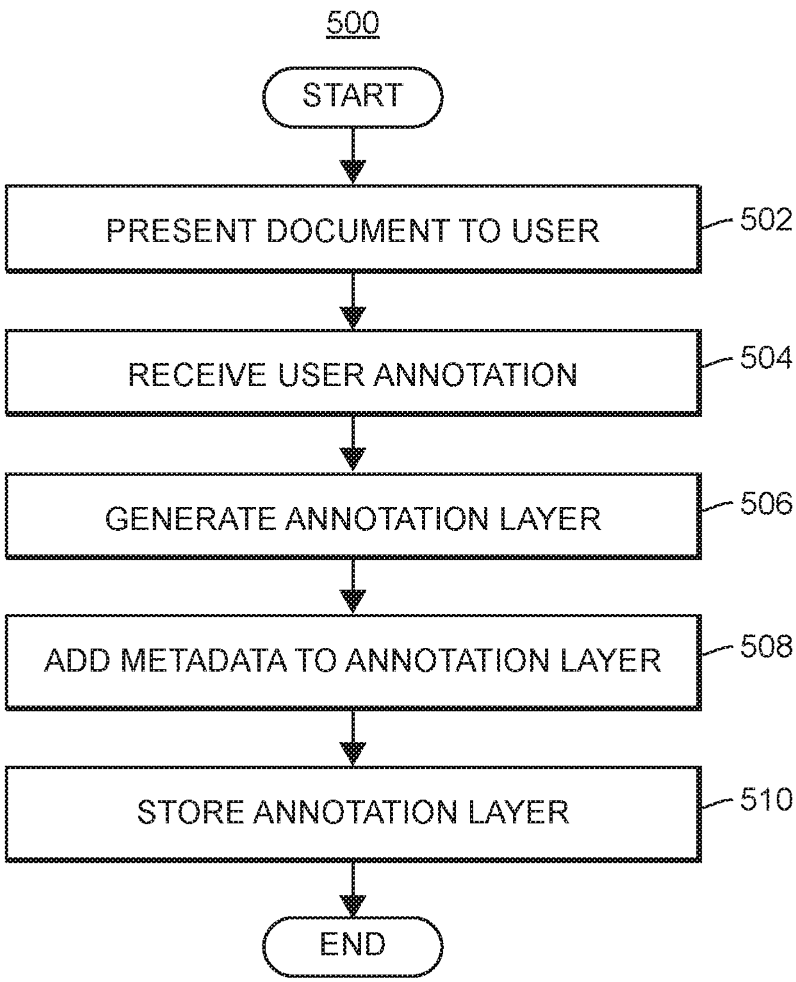
FIG. 5 illustrates a flow diagram of an exemplary annotation creation method for generating new annotation layers from user annotations.
Figure 6:
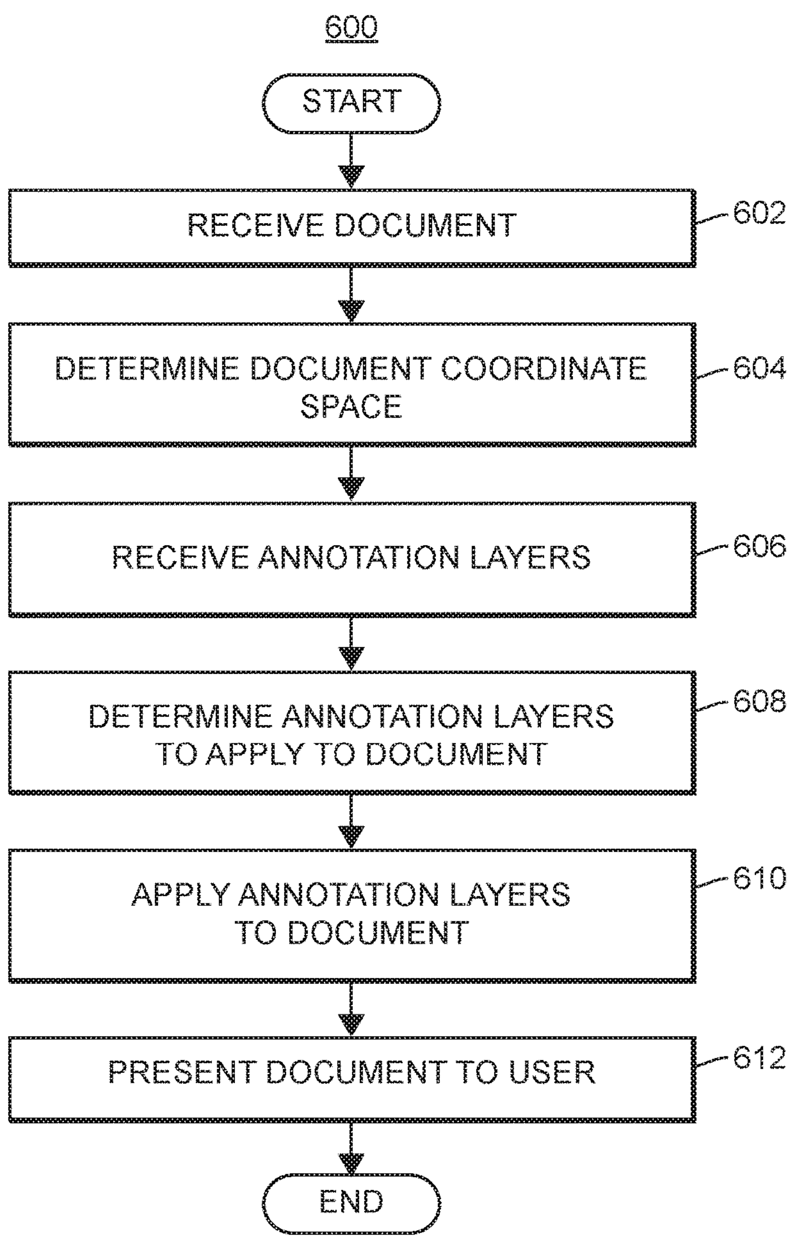
FIG. 6 illustrates a flow diagram of an exemplary annotation presentation method for using annotation layers to display the annotated document to the user.
Figure 7:
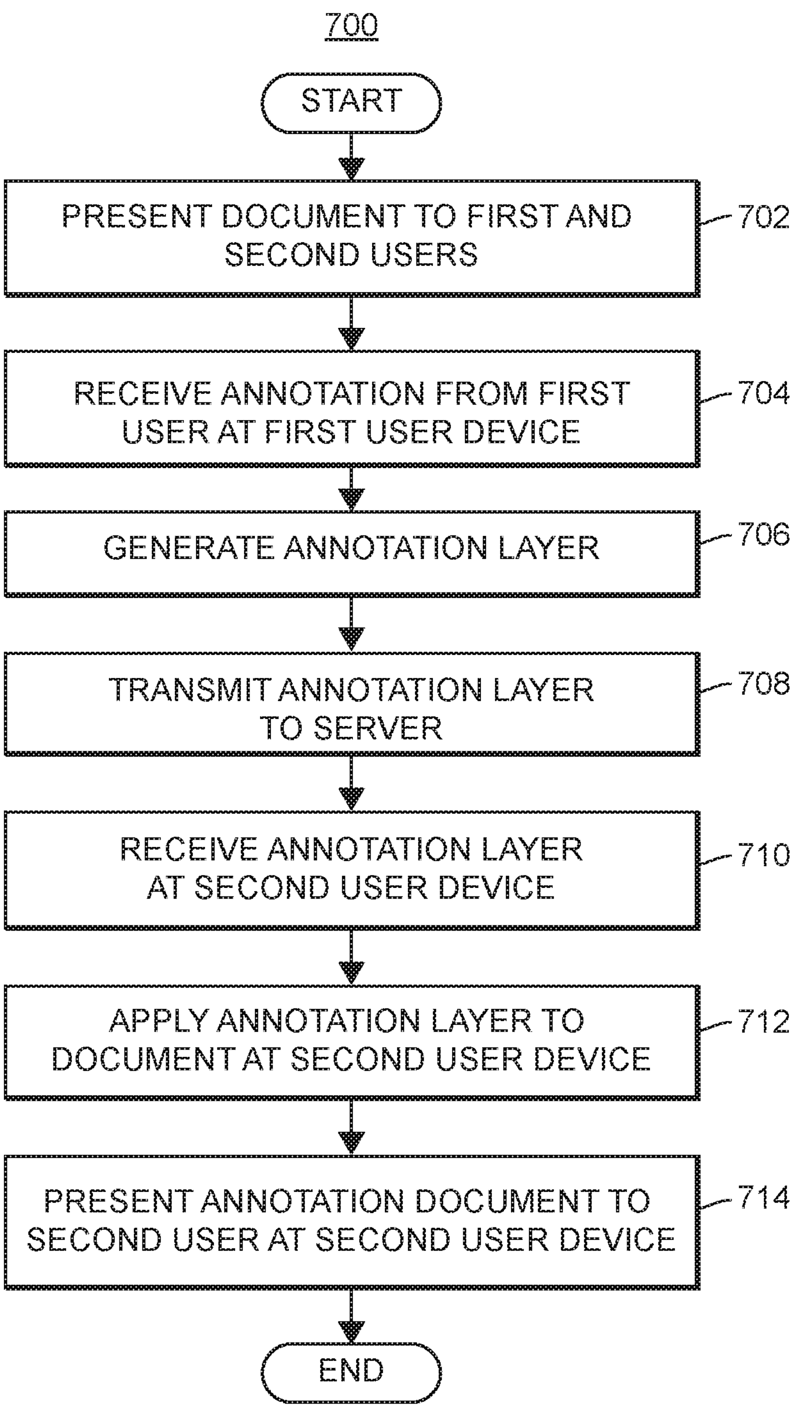
FIG. 7 illustrates a flow diagram of an exemplary annotation sharing method for synchronizing annotations among multiple users.

The following description generally relates to the generation, storage, transmission, and use of annotation layers. FIG. 5 addresses the creation of annotation layers by a user. FIG. 6 addresses the use of annotation layers in presenting annotations to a user. FIG. 7 addresses sharing of annotation layers between multiple users of the annotation system. Each of the following methods may be implemented, separately or in conjunction, using the exemplary annotation system 200, described above. The various exemplary methods described herein may be implemented using any or all of the first user device 210, the second user device 220, or the server 240. In addition, each document may be the document 122, and each annotation layer may be one of the annotation layers 246 (including annotation layers 132 and 136). Although the annotation layers are discussed below as annotating a document 122 such as a text document for the sake of clarity, annotation layers described herein may likewise annotate other annotation layers. Thus, annotation layers may likewise serve as the source document to be annotated in some embodiments. For example, a comment made in a first annotation layer may itself be edited or linked in a second annotation layer.

FIG. 5 illustrates a flow diagram of an exemplary annotation creation method 500 for generating new annotation layers from user annotations. The exemplary annotation creation method 500 may also be used to modify or edit existing annotation layers, in some embodiments. The document to be annotated is presented to the user at block 502, which may include presentation of existing annotation layers as discussed elsewhere herein. The user may then input an annotation, such as by drawing an annotation on a touchscreen display, which is received by the user device at block 504. The received annotation is then processed to generate an annotation layer 506 that can be used to replicate the annotation. Metadata regarding the annotation may be added to the annotation layer at block 508, and the annotation layer may be stored locally or remotely at block 510. The stored annotation layer may be presented to the user or may be transmitted to another user, as described further elsewhere herein. Although the following description of the exemplary annotation creation method 500 refers to creating a new annotation layer for the document 122 at the first user device 210 for clarity, such description is not intended to be limiting. Annotation layers may be created at any of a plurality of user devices or servers for any of a plurality of documents.

At block 502, one or more documents may be presented to one or more users via user devices. For example, the document 122 may be presented to the user of the first user device 210. Presentation of the document 122 may include presentation of one or more existing annotation layers available at the first user device 210, which presentation may be controlled by the annotation application 214. For example, the first user device 210 may include the annotation layer 132 stored in the local memory 212. If the user has chosen to filter the annotation layers or if the user only has permission to view a limited subset of annotation layers, only the appropriate subset of annotation layers may be presented to the user. Other annotation layers 246 may not be presented if they are unavailable to the user or if the user has selected not to view them. Presentation of the document 122 (and the annotation layer 132) may include display of the document 122 (and annotation layer 132) via a display 812 of the first user device 210, as discussed elsewhere herein.

At block 504, the user may enter an indication of an annotation into the first user device 210. The indication of the annotation may be received via an input 814 of the first user device 210, such as a keyboard, mouse, track pad, touchscreen display, camera, or microphone. For example, the user may enter an indication of the annotation 138 by marking the annotation on a touchscreen. The annotation 138 may be processed by the first user device 210 and received by the annotation application 214. As used herein, the terms "annotation" and "annotate" may refer to either or both of an action of the user in entering an indication of intended content to be added to the document or a representation of the intended content in a computer-readable format. For example, the user may annotate the document 122 by drawing marks upon a touchscreen displaying the document 122, which marks may be interpreted by hardware or software modules of the first user device 210 and communicated as an annotation in a computer-readable format to the annotation application 214. Annotations may include free-form markings, pre-defined stamps, text, images, sounds, video clips, or any other type of information. In some embodiments, the user may further specify a link or reference 139 to another document or external data source, which may be included with the annotation 138 in the annotation layer 136 generated at block 506.

At block 506, the annotation layer 136 corresponding to the annotation 138 may be generated by the annotation application 214 of the first user device 210. The annotation application 214 may generate the annotation layer 136 by creating a file including an indication of the coordinate space of the annotation layer 136 (corresponding to the coordinate space of the document 122) and indications of the location, type, and content of the annotation 138 to be included in the annotation layer 136. For example, the annotation layer 136 may be generated by creating a file or an object storing information sufficient to recreate the annotation 138 in a transparent layer to be overlaid upon the document 122. Part or all of this information may be stored in general-use or special-purpose computer-readable text, graphics, or audio file formats. Alternatively, the annotation layer 136 may be generated by adding an entry into a database storing annotation layers, as described above.

At block 508, the annotation application 214 may generate and add the metadata 144 associated with the annotation 138 to the annotation layer 136. As discussed above, the metadata 144 may include information relating to the creation of the annotation layer 136, including the identity of the user of the first user device 210, the date and time of the annotation 138, an indication of the document 122 or a version of the document 122, restrictions or permissions for viewing or editing the annotation layer 136, any external resources referenced in the annotation layer 136, a screen size of the display 812, an orientation of the display 812, or other information regarding how, when, where, or by whom the annotation 138 was created. As discussed above, the metadata 144 may be included within the annotation layer 136, appended to the annotation layer 136, or otherwise associated with the annotation layer 136.

At block 510, the annotation layer 136 may be stored in the local memory 212 of the first user device 210. The annotation layer 136 may be stored as a separate file within the local memory 212 in order to facilitate communication and presentation of the annotation 138 included therein. In some embodiments, the annotation layer 136 or a reference to the annotation layer 136 may be stored or recorded in a database within the local memory 212, such that the annotation layer 136 may be obtained by querying the database. In some embodiments, the annotation layer 136 may be combined with other annotation layers available at the first user device 210 to generate a temporary combined annotation layer to reduce processing time needed to present the annotation layers. This may be particularly useful when a large number of annotation layers are presented. Such temporary combined annotation layer may be stored in volatile memory of the first user device 210, such as the RAM 824. In further embodiments, the annotation layer 136 may be sent to the server 240 via the communication network 230 by the communication module 216, and the server 240 may store the annotation layer 136 in a program memory 860 or a database 846 for access or transmission to a user device.

FIG. 6 illustrates a flow diagram of an exemplary annotation presentation method 600 for using annotation layers to display the annotated document to the user. The annotation presentation method 600 may begin with receipt of the document at block 602. The document coordinate space may then be determined at block 604, and one or more annotation layers may be received at block 606. Of the received annotation layers, one or more may be selected to be presented at block 608, such as when a user filters the annotation layers using the metadata. In some embodiments, such filtering or selection may occur before receiving the one or more annotation layers at block 606 in order to avoid receiving annotation layers that will not be displayed. Once the annotation layers to be presented have been determined and the annotation layers received, the appropriate annotation layers may be applied to the document at block 610 to generate an annotated document to be presented to the user at block 612. The annotation layers may be applied by overlaying each annotation layer over the document in a sequential manner to show annotations floating on top of the document, without changing the document itself. Although the following description of the exemplary annotation presentation method 600 refers to presenting annotation layers 132 and 136 of the document 122 at the first user device 210 for clarity, such description is not intended to be limiting. Any number of annotation layers associated with any number of documents may be presented at any of a plurality of user devices or servers for any of a plurality of documents.

At block 602, the annotation application 214 of the first user device 210 may receive the document 122. The document 122 may be received from an external source (such as the server 240) or may be received from the local memory 212 of the first user device 210. In some embodiments, receiving the document 122 may include generating a new document or importing a document from another application or program executing on the first user device 210. The annotation application 214 may create a copy of the document 122 in some embodiments, particularly when the document 122 is stored on the server 122 in a cloud computing arrangement. In further embodiments, the document 122 may be converted from one format to another format or may be otherwise processed (e.g., by applying optical character recognition routines to identify text within the document).

At block 604, the annotation application 214 may determine the coordinate space corresponding to the document 122. This may include processing the document 122 to determine the document type, duration (e.g., number of pages, number of slides, number of frames, number of columns or rows, etc.), size (e.g., paper size, number of pixels, column width, frame width and height, etc.), or other information regarding the dimensions of the document 122. The document type may indicate a general type of document, such as page-based, canvas-based, or time-based. A page-based document includes one or more pages of definite size, such as pages in a text document generated by word processing software (e.g., Microsoft Word® documents), publication layout software (e.g., Adobe Acrobat® documents), slide presentation software (e.g., Microsoft PowerPoint® documents), or other software for generating or displaying documents consisting of a number of pages of definite size. A canvas-based document includes a fixed origin point, with all other coordinates determined relative to such fixed origin point. Canvas-based documents do not have limited height or width, but instead can be of any height or width (measured in distance from the origin point) that is determined to be necessary based upon the content. A web page in HTML is an example of a canvas-based document, with the origin point fixed in the upper left corner and all content being (directly or indirectly) described relative to that point. A time-based document includes a plurality of components to be presented at different times, such as a plurality of frames in a video file. Each point in time contains information, such as a frame or a sound. In addition to the type, the size of each page, canvas, or frame may be determined as part of the coordinate space. The size may be determined relative to an external measure, such as the height and width of a page measured in inches or millimeters. The size may additionally or alternatively be measured relative to the presentation on a display device, such as the number of pixels covered or a distance along the surface of a screen. In some embodiments, information regarding the coordinate space may be read from the metadata 142 or 144 associated with the annotation layers 132 or 136 associated with the document 122, which may require first receiving annotation layers at block 606.

At block 606, the annotation application 214 may receive one or more annotation layers associated with the document 122, such as the annotation layers 132 and 136. The annotation layers 132 and 136 may be received by accessing the local memory 212 of the first user device 210. The annotation layers 132 and 136 may alternatively be received from a source external to the first user device 210 via the network 230, such as the server 240. The first user device 210 may request annotation layers from the server 240 or may automatically receive new annotation layers from the server 240 without sending a request. In some embodiments, the server 240 may receive or maintain a list of annotation layers available at the first user device 210. In other embodiments, the user device 210 may transmit a list of annotation layers stored in the local memory 212. The server 240 may then send the user device 210 copies of only those annotation layers associated with the document 122 that are not available at the first user device 210 (i.e., the server 240 may transmit via the network 230 files corresponding to only annotation layers stored at the server 240 but not in the local memory 212 of the first user device 210). The server may further request new annotation layers stored at the first user device 210 but not stored at the server 240. In a preferred embodiment, each annotation layer is received by the annotation application 214 as separate computer-readable files. Each file containing a separate annotation layer may include an indication of the document 122 with which the annotation layer is associated in the metadata contained within the file. In some embodiments, a look-up table or database may be used to record associations between annotation layers and documents. Additionally, one or more of the annotation layers 132 and 136 may be received from the user by creating a new annotation layer, as discussed above.

At block 608, the annotation application 214 may determine one or more annotation layers to apply to the document 122 from the received annotation layers. The user of the first user device 210 may select specific annotation layers to present or may deselect annotation layers not to present. In further embodiments, the user of the first user device 210 may select or set criteria indicating whether annotations should be presented based upon metadata associated with the annotation layers. For example, the user may provide an indication that only annotation layers associated with one or more specified users should be presented. As another example, only annotations associated with the current version of the document 122 may be presented by default. As yet another example, the user may select a time period according to which annotation layers should be presented, such as only presenting annotation layers that were created after the time at which the user previously reviewed the document 122. Additional or alternative metadata criteria may be used to filter the annotation layers to determine which annotation layers are to be applied to the document 122 and presented to the user.

In some embodiments, the annotation layers may be stored at the server 240 and transmitted to the first user device 210 only as needed, in which case the annotation application 214 may transmit metadata criteria to the server 240 via the network 230 prior to receiving the annotation layers at block 606. In response to receiving a request indicating the metadata criteria, the server application 242 may then determine which annotation layers 246 stored at the server 240 should be transmitted to the first user device 210. In an embodiment in which the first user device 210 operates as a thin client with respect to the annotation application 214, for example, the document 122 or annotation layers 132 and 136 may be stored only temporarily in the local memory 212, such that the document 122 or annotation layers 132 and 136 must be received from the server 240 each time the annotated document is presented to the user by the annotation application 214. In a further embodiment, the server 240 may apply the selected annotation layers to the document 122 prior to sending the combined annotated document to the first user device 210. In some further embodiments, the server application 242 may combine one or more annotation layers prior to transmission in order to further reduce the amount of data communicated over the network 230. If a received annotation layer to be applied to the document 122 includes a reference 139 to an external document or data source, the annotation application 214 or server application 242 may further obtain a copy of part or all of such referenced external material from the external data source 250.

At block 610, the annotation application 214 may apply the annotation layers that were determined at block 608 to the document 122 to produce an annotated document. For example, if the layers 132 and 136 had been selected at block 608 from the annotation layers 246, the annotation application 214 applies the annotation layers 132 and 136 to the document 122 at block 610. To apply the annotation layers to the document, the annotation application 214 may cause the document and the annotations to be rendered by one or more processors 820 of the first user device 210. The one or more processors 820 may be general processors or specialized processors, such as within a graphics processing unit (GPU). In a preferred embodiment, the annotation layers 132 and 138 are transparent (aside from the annotations 134 and 138) and are applied by overlaying the annotation layers upon the document 122 to produce the annotated document shown in the annotated display view 116. By analogy, the annotation layers are applied like panes of glass or transparent plastic having markings drawn thereon, which may be stacked on top of the document 122 to show the annotations without changing the document 122.

In some embodiments, the annotations may be iteratively applied such that later-applied annotation layers overlay earlier-applied layers. For example, the annotation layer 132 may first be applied to the document 122, producing a partially annotated document as shown in the annotated display view 114; then the annotation layer 136 may be next applied to the partially annotated document (the document 122 and the annotation layer 132), producing the annotated document as shown in the annotated display view 116. If a later-applied annotation layer includes an annotation that overlaps an annotation in an earlier-applied annotation layer, the annotation of the later-applied annotation layer may overlay and obscure the annotation of the earlier-applied annotation layer. In further embodiments, characteristics of the annotations may be applied differently based upon the metadata associated with each annotation layer. For example, annotation layers associated with different users or different time periods may be assigned different colors when applied to the document. Each annotation within an annotation layer may be displayed in the color assigned to the annotation layer when the annotated document is presented to the user at block 612.

Because the annotation layers are separate from the document 122, the annotation layers may be applied to documents in any format. Once the coordinate space of the document 122 or copy of the document 122 is determined, annotation layers may be applied regardless of the format in which the document 122 is stored or presented. Thus, an annotation layer that was created for a copy of the document 122 using one format may be applied to another copy of the document 122 that uses a different format. For example, an annotation layer may originally be created for the document 122 by the first user at the first user device 210 in a word processing application, but the same annotation layer may be later applied to a static copy of the document 122 viewed by the second user at the second user device 220 using a graphical image viewing software application.

At block 612, the annotated document generated at block 610 may be presented to the user via the display 812 of the first user device 210. When the annotated document includes two annotation layers 132 and 136 (as illustrated in FIG. 1), presenting the annotated document may include presenting the annotated display view 116 of the document 122, showing the document content 124, the annotations 134 and 138. The reference 139 may be a transparent portion of the annotated display view 116 that may facilitate user interaction to obtain information from the associated external source, or it may be presented as a reference indicator 118, as discussed above. The annotated document may be presented to the user in any convenience format. In some embodiments, the annotated document may be presented in a special-purpose application (which may be or include the annotation application 212) configured to present and receive annotations of documents. In other embodiments, the annotation application 214 may cause the annotated document to be presented to the user in the document's native application or in a preview window, regardless of whether the native application or preview window is configured to accept or create new annotation layers. This may be accomplished by use of macros, plug-ins, or other software instructions adapted to operate with, or to be called by, the native application or preview window.

FIG. 7 illustrates a flow diagram of an exemplary annotation sharing method 700 for synchronizing annotations among multiple users. For example, the exemplary annotation sharing method 700 may be implemented to send an annotation made by a first user at the first user device 210 to the server 240 and from the server 240 to a second user at the second user device 220. The document to be annotated may be presented to the first and second users at block 702. Upon receipt at the first user device 210 of an annotation from the first user at block 704, an annotation layer may be generated at block 706. The annotation layer may then be sent to the server 240 at block 708, which may then send the annotation layer to the second user at block 710. At block 714, the annotation layer may be presented to the second user at the second user device 220. Because the first and second user devices 210 and 220 each have a copy of the document in their respective local memories 212 and 222, only the annotation layer needs to be transmitted between the devices. Although the following description of the exemplary annotation sharing method 700 refers to creating and sharing an annotation layer 136 for the document 122 at the first user device 210 and sending the annotation layer 136 to be displayed at the second user device 220 for clarity, such description is not intended to be limiting. Any number of annotation layers may be created and sent to any of a plurality of user devices or servers for any of a plurality of documents.

At block 702, copies of the document 122 may be displayed to a first user of the first user device 210 and a second user of the second user device 220. The copies of the document 122 may be identical copies, different versions of the document 122, or copies in different formats. Each user device 210 or 220 may store a local copy of the document 122 in the local memory 212 or 222, respectively. The copies presented to the first and second users may include previously generated annotations applied using annotation layers, as discussed above. For example, the document 122 may be presented together with the annotation layer 132 overlaid to present the annotation 134, as indicated in the annotated display view 114.

At block 704, the first user may create a new annotation 138 at the first user device 210. As described above, the annotation 138 may be received from the first user at the first user device 210 via an input 814. Upon receiving the annotation 138, the annotation application 214 may generate the annotation layer 136, as discussed elsewhere herein. In some embodiments, the annotation layer 136 may include a reference 139, which may be included in the annotation layer 136. Additionally, metadata 144 or other data may be associated with or included in the annotation layer 136.

At block 708, the annotation application 214 may cause the generated annotation layer 136 to be transmitted via the network 230 using the communication module 216. In a preferred embodiment, the annotation application 214 may automatically cause the annotation layer 136 to be transmitted to the server 240 upon generating the annotation layer 136, without further user input. In some embodiments, such transmission may be immediate; in other embodiments, the first user device 210 may send annotation layers periodically to the server 240. In further embodiments, the first user may select an option to send the annotation layer 136 to the server 240 or to the second user device 220 (e.g., by choosing an option to upload, share, or sync the annotation layer 136). The annotation application 214 may package the annotation layer 136 for transmission through the network 230. In some embodiments, this may include packaging multiple annotation layer together in such a manner that they may be separated when received at the server 240 or the second user device 220. In a preferred embodiment, however, each annotation layer 136 is separately sent from the first user device 210 to the server 240 via the network 230, whereupon the server 240 stores the annotation layer 136 as a separate annotation layer 136 with the other annotation layers 246 stored at the server 240.

Each annotation layer may thus be stored and transmitted separately from the document 122 with which it is associated, without transmission or storage of the document 122 or a copy thereof. This greatly reduces the amount of data to be stored or transmitted via the network 230 and facilitates efficient annotation of documents by multiple users. Moreover, the annotation layer 136 may be sent to the server 140 in a standard format that may be applied to the document 122 regardless of the format in which the document 122 is stored or presented at another user device. The annotation layers may be transmitted and stored in any convenient manner. In some embodiments, each annotation layer may be stored as one or more entries in a table or database within or communicatively connected to the server 240. In further embodiments, each annotation layer may be stored as a separate file. In yet further embodiments, part of each annotation layer may be stored as a separate file, which may be associated with or referenced by another file or an entry in a database.

At block 710, the annotation application 224 of the second user device 220 may receive the annotation layer 136 via the network 230 using the communication module 326. In some embodiments, the annotation layer 136 may be received from the server 240. In other embodiments, the annotation layer 136 may be received from the first user device 210 through the network 230. The annotation layer 136 may be transmitted automatically from the server 240 to the second user device 220 without a request from the second user device 220 (e.g., it may be pushed to the second user device 220). In other embodiments, the second user device 220 may poll the server 240 by requesting annotation layers associated with the document 122 from the server 240 via the network 230. The received annotation layer 136 may be stored in the local memory 222 of the second user device 220. In some embodiments, additional metadata regarding the receipt of the annotation layer 136 may be added to the metadata 144 of the annotation layer 136 (e.g., date and time received).

At block 712, the annotation application 224 may apply the received annotation layer 136 to be applied to the document 122. Applying the annotation layer 136 to the document 122 may be accomplished as discussed elsewhere herein, particularly with respect to the annotation presentation method 600. The annotation layer 136 may be applied in a similar manner to the manner of applying an annotation layer generated at the second user device 122 or an existing annotation layer stored in the local memory 222 of the second user device 220. In some embodiments, the received annotation layer 136 may be assigned particular display characteristics based upon the metadata associated with the annotation layer 136. For example, the annotation 138 of the annotation layer 136 may be displayed using a different color to indicate that the annotation layer 136 was generated at the first user device 210 by the first user.

At block 714, the annotation application 224 may cause the annotated document to be presented to the second user via the display 812 of the second user device 220. When the annotated document to be presented to the second user at the second user device 220 includes the document 122 and the two annotation layers 132 and 136 (as illustrated in FIG. 1), presenting the annotated document may include presenting the annotated display view 116, as discussed above. As noted, the annotated document may be presented in such a manner as to indicate that the annotation 138 of the received annotation layer 136 was created by the first user on the first user device 210, but use of a different color, comment bubble, or otherwise.

Exemplary System Configuration

Figure 8:
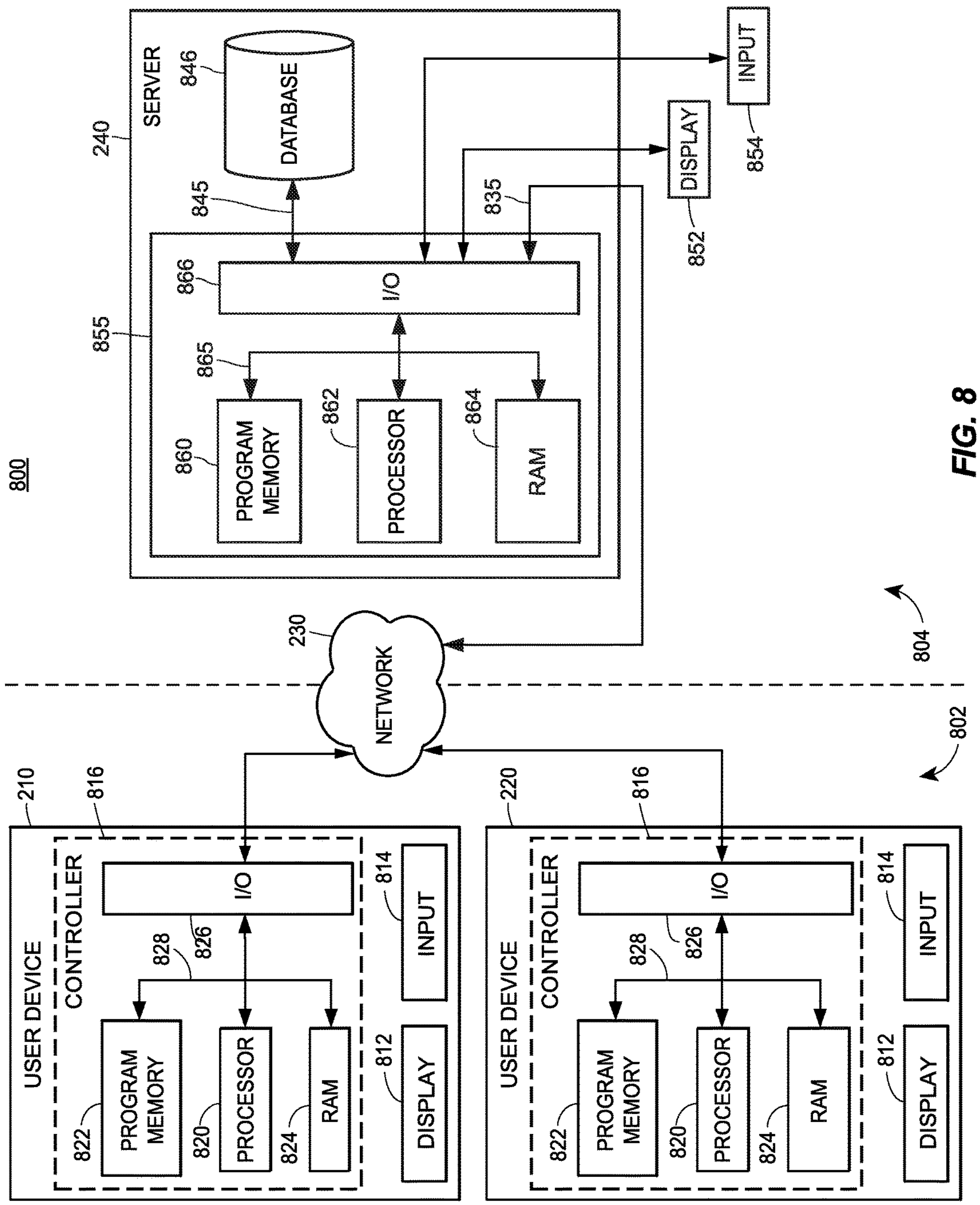
FIG. 8 illustrates an exemplary computing system for implementing the methods as described herein.

FIG. 8 illustrates an exemplary computing system 800 for implementing the methods as described herein. The exemplary computing system 800 may be particularly used to implement the system 200 discussed above. The exemplary computing system 800 includes front-end components 802 and back-end components 804, communicatively connected through the network 230. The front-end components 802 may be disposed within user devices 210 and 220, and the back-end components 804 may be disposed within one or more servers 240. Each server 240 may further include or be communicatively connected to one or more databases 846. Although the example system 800 illustrates two user devices 210 and 220 and one server 240, it should be understood that the methods described herein may be implemented using any number of user devices or servers. Additionally, in some embodiments, portions of the system may be implemented on separate servers 240 or computing devices 210 and 220.

The user devices 210 and 220 may each include a display 812, an input 814, and a controller 816. The input 814 may include a "soft" keyboard that is displayed on the display 812 of the user device 210 or 220, an external hardware keyboard communicating via a wired or a wireless connection (e.g., a Bluetooth keyboard), an external mouse, or any other suitable user-input device. The controller 816 includes one or more processors 820, a program memory 822, a RAM 824, and an I/O circuit 826, all of which are interconnected via an address/data bus 828. The program memory 822 may include an operating system, a data storage, a plurality of software applications, and a plurality of software routines. The program memory 822 may also include the memory 212 or 222 storing documents and annotation layers, as well as software applications, routines, or scripts for implementing part or all of the methods 400-700 above. The program memory 822 may store computer-readable instructions or code associated with the annotation application 214 or 224 or with the communication module 216 or 226. It should be appreciated that although FIG. 8 depicts only one processor

820 in each controller 816, one or more controllers 816 may include multiple processors 820. Similarly, each controller 816 may include multiple program memories 822 or multiple RAMs 824. Although the FIG. 8 depicts the I/O circuit 826 as a single block, the I/O circuit 826 may include a number of different types of I/O circuits. The controllers 816 may implement the program memories 822 or the RAMs 824 as semiconductor memories, magnetically readable memories, or optically readable memories, for example.

In some embodiments, the front-end components 802 may communicate with the back-end components 804 via the network 230. The network 230 may be a proprietary network, a secure public internet, a virtual private network or some other type of network, such as dedicated access lines, plain ordinary telephone lines, satellite links, cellular data networks, combinations of these, etc. Where the network 230 comprises the Internet, data communications may take place over the network 230 via an Internet communication protocol.

The back-end components 804 may include one or more servers 240. Each server 240 may include one or more processors 862 adapted and configured to execute various software applications, such as the server application 242 or the web server application 244. As with the user devices 210 and 220, the server 240 may include or be communicatively connected to one or more displays 852 and inputs 854. The server 240 may further include a database 846, which may be adapted to store data related to the computing system 800, such as documents and annotation layers uploaded to the server 240 via the network 230. The server 240 may access data stored in the database 846 upon receiving a request for data from the user devices 210 and 220. The server 240 may have a controller 855 that is operatively connected to the database 846 via a link 845. It should be noted that, while not shown, additional databases may be linked to the controller 855 in a known manner. The controller 855 may include a program memory 860, a processor 862, a RAM 864, and an I/O circuit 866, all of which may be interconnected via an address/data bus 865. As with the controllers 816, it should be appreciated that although only one processor 862 is shown, the controller 855 may include multiple processors 862. Similarly, the memory of the controller 855 may include multiple RAMs 864 and multiple program memories 860. The program memory 860 may include software applications, routines, or scripts for implementing part or all of the methods 400-700 above, particularly those portions of the methods described above that involve storing or transmitting documents or annotation layers. Although the I/O circuit 866 is shown as a single block, it should be appreciated that the I/O circuit 866 may include a number of different types of I/O circuits. The RAM 864 and program memories 860 may be implemented as semiconductor memories, magnetically readable memories, or optically readable memories, for example. The controller 855 may also be operatively connected to the network 230 via a link 835. The server 240 may further include a number of software applications stored in a program memory 860.

In accordance with the systems and method described above, the exemplary computing system 800 may implement any of the foregoing methods utilizing annotation layers or connectors associated with documents. For example, annotation or mark-up tools such as the annotation application 214, the annotation application 224, the server application 242, the web server application 244, or similar software tools may be implemented by the processors 620 or 662 of the user devices 210 or 220 or the server 240. In some embodiments, portions of the annotation or mark-up tools may be implemented by processors 620 or 662 of separate devices communicating via the network 230, as discussed above.

Additional Considerations

Throughout this specification, plural instances may implement components, operations, or structures described as a single instance. Although individual operations of one or more methods are illustrated and described as separate operations, one or more of the individual operations may be performed concurrently or in an order other than the order illustrated, unless the context indicates otherwise. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, modules, or instructions. These may constitute either software (code embodied on a non-transitory, tangible computer-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware components of a computer system (e.g., a processor or a group of processors) may be configured by software (e.g., an application or application portion) as a hardware module that operates to perform certain operations as described herein.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. Communicative coupling of elements may include continuous, periodic, or asynchronous communication among the elements. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

What is claimed is:

1. A computer-implemented method, comprising:

receiving, at one or more processors of a user computing device, a first electronic document;

presenting, via a display of the user computing device, the first electronic document to a user of the user computing device;

receiving, at one or more processors of the user computing device, an indication of an annotation of a portion of the first electronic document from the user;

generating, by one or more processors of the user computing device, first annotation layer including (i) an image of the annotation, (ii) an indication of a coordinate space of the electronic document, (iii) a position of the image of the annotation within the coordinate space, and (iv) a reference linking the first annotation layer to a second annotation layer associated with a portion of a second electronic document by an identifier of the second annotation layer, wherein the first annotation layer is stored in a separate file from the first electronic document and wherein the first annotation layer is independent of the file format of the first electronic document;

applying, by one or more processors of the user computing device, the first annotation layer to the first electronic document by overlaying the first annotation layer over the portion of the first electronic document, such that the first annotation layer and the first electronic document remain separate;

presenting, by the display of the user computing device, the first electronic document and the overlaid first annotation layer to the user, wherein presenting the overlaid first annotation layer includes presenting a reference indicator visually representing the reference linking the first annotation layer to the second annotation layer;

receiving, at one or more processors, a user selection of the reference indicator from the user;

accessing, by one or more processors, the second annotation layer based upon the identifier of the second annotation layer and in response to the user selection of the reference indicator;

identifying, by one or more processors, the second electronic document based upon an identifier of the second electronic document included in the second annotation layer;

applying, by one or more processors of the user computing device, the second annotation layer to the second electronic document by overlaying the second annotation layer over the portion of the second electronic document, such that the second annotation layer and the second electronic document remain separate; and presenting, by the display of the user computing device, the second electronic document and the overlaid second annotation layer to the user.

2. The computer-implemented method of claim 1, wherein the first annotation layer is stored as a separate file from an additional annotation layer associated with the first electronic document.

3. The computer-implemented method of claim 1, further comprising communicating, via a network, the first annotation layer to a second user computing device to be presented to a second user.

4. The computer-implemented method of claim 3, further comprising receiving, at one or more processors of the user computing device, a selection of an option to transmit the first annotation layer to the second user, wherein the first annotation layer is communicated to the second user in response to the received selection.

5. The computer-implemented method of claim 3, wherein:

communicating the first annotation layer to the second user computing device includes communicating the first annotation layer to a server communicatively connected via the network to the user device and to the second user device;

the first annotation layer includes metadata regarding the first annotation layer; and the server communicates the annotation to the second user computing device based upon the metadata of the first annotation layer.

6. The computer-implemented method of claim 1, wherein the reference includes an annotation of the second electronic document to be overlaid over the portion of the second electronic document.

7. The computer-implemented method of claim 1, wherein applying the first annotation layer to the first electronic document includes generating a link to the portion of the second electronic document, wherein the link includes instructions that cause the portion of the second electronic document to be presented when the link is selected by the user.

8. The computer-implemented method of claim 1, wherein:

generating the first annotation layer includes generating the second annotation layer;

the first annotation layer and the second annotation layer are stored in a connector file that forms a bidirectional link between the first electronic document and the second electronic document;

presenting the overlaid second annotation layer includes presenting a second reference indicator visually representing a reverse path of the reference linking the first annotation layer to the second annotation layer; and the computer-implemented method further comprises:

receiving, at one or more processors, a second user selection of the second reference indicator from the user;

accessing, by one or more processors, the first annotation layer based upon the reference linking the first annotation layer to a second annotation layer and in response to the second user selection of the second reference indicator;

identifying, by one or more processors, the first electronic document based upon an identifier of the first electronic document included in the first annotation layer;

applying, by one or more processors of the user computing device, the first annotation layer to the first electronic document by overlaying the first annotation layer over the portion of the first electronic document, such that the first annotation layer and the first electronic document remain separate; and presenting, by the display of the user computing device, the first electronic document and the overlaid first annotation layer to the user.

9. A tangible, non-transitory computer-readable medium storing executable instructions that, when executed by one or more processors of a computer system, cause the computer system to:

receive a first electronic document;

determine a coordinate space corresponding to the received first electronic document, wherein the coordinate space indicates the dimensions of the received first electronic document;

present the first electronic document to a user of the computer system;

receive an indication of an annotation of a portion of the first electronic document from the user;

generate a first annotation layer including information describing the annotation, wherein the first annotation layer has a coordinate space that matches the coordinate space of the first electronic document or a discrete unit of the first electronic document and the first annotation layer includes (i) an image of the annotation, (ii) an indication of the coordinate space of the electronic document, (iii) a position of the image of the annotation within the coordinate space, and (iv) a reference linking the first annotation layer to a second annotation layer associated with a portion of a second electronic document by an identifier of the second annotation layer, and wherein the first annotation layer is independent of the file format of the first electronic document;

apply the first annotation layer to the first electronic document by overlaying the first annotation layer over the portion of the first electronic document, such that the first annotation layer and the first electronic document remain separate;

present the first electronic document and the overlaid first annotation layer to the user via a display of the computer system, wherein presenting the overlaid first annotation layer includes presenting a reference indicator visually representing the reference linking the first annotation layer to the second annotation layer;

receive a user selection of the reference indicator from the user;

access the second annotation layer based upon the identifier of the second annotation layer and in response to the user selection of the reference indicator;

identify the second electronic document based upon an identifier of the second electronic document included in the second annotation layer;

apply the second annotation layer to the second electronic document by overlaying the second annotation layer over the portion of the second electronic document, such that the second annotation layer and the second electronic document remain separate; and present the second electronic document and the overlaid second annotation layer to the user via the display of the computer system.

10. The tangible, non-transitory computer-readable medium of claim 9, wherein the first annotation layer is stored as a separate file from the first electronic document.

11. The tangible, non-transitory computer-readable medium of claim 9, wherein the coordinate spaces of the first electronic document and the first annotation layer are one of the following: a page-based coordinate space, a canvas-based coordinate space, or a time-based coordinate space.

12. The tangible, non-transitory computer-readable medium of claim 9, wherein the executable instructions further cause the computer system to:

receive, via a network connection, a third annotation layer including a description of a second annotation of a second portion of the first electronic document from a user of another computer system, wherein the third annotation layer does not include the first electronic document or a copy thereof;

apply the received third annotation layer to the first electronic document such that the third annotation overlays the second portion of the first electronic document; and present the first electronic document overlaid by the first annotation layer and by the third annotation layer to the user via the display of the computer system.

13. The tangible, non-transitory computer-readable medium of claim 9, wherein:

the first annotation layer is a member of a set comprising a plurality of annotation layers;

each member of the set of the plurality of annotation layers includes metadata corresponding the member of the set of the plurality of annotation layers;

the executable instructions further cause the computer system to receive an indication of metadata criteria corresponding to one or more members of the set of the plurality of annotation layers, wherein the one or more members of the set include the first annotation layer; and the executable instructions that cause the computer system to present the first electronic document and the overlaid first annotation layer to the user cause an overlay of each member of the set of the annotation layers having metadata meeting the metadata criteria to be presented over a presentation of the first electronic document, wherein any member of the set of the plurality of annotations layers having metadata not meeting the metadata criteria is not presented.

14. The tangible, non-transitory computer-readable medium of claim 9, wherein the executable instructions further cause the computer system to:

receive an indication of another annotation including a link to another document;

generate another annotation layer including information describing the another annotation and including the link to the another document, wherein the another annotation layer has a coordinate space that corresponds to the coordinate space of the first electronic document;

apply the another annotation layer to the first electronic document such that the another annotation overlays the portion of the first electronic document, wherein all of the first annotation layer, the another annotation layer, and the first electronic document remain separate;

present the first electronic document, the overlaid first annotation layer, and the another annotation layer to the user via the display; and receive a user selection of a portion of the another annotation; and present at least a portion of the another document to the user via the display using the received link.

* * * * *